United States Patent
Tanabe et al.

(10) Patent No.: US 9,550,165 B2
(45) Date of Patent: Jan. 24, 2017

(54) CATALYTIC REACTOR

(71) Applicant: SUMITOMO PRECISION PRODUCTS CO., LTD., Amagasaki-shi, Hyogo (JP)

(72) Inventors: Akihiro Tanabe, Hyogo (JP); Naoki Kashi, Hyogo (JP)

(73) Assignee: SUMITOMO PRECISION PRODUCTS CO., LTD, Hyogo (JP)

( * ) Notice: Subject to any disclaimer, the term of this patent is extended or adjusted under 35 U.S.C. 154(b) by 0 days.

(21) Appl. No.: 14/762,785

(22) PCT Filed: Jan. 21, 2014

(86) PCT No.: PCT/JP2014/000272
§ 371 (c)(1),
(2) Date: Jul. 22, 2015

(87) PCT Pub. No.: WO2014/115534
PCT Pub. Date: Jul. 31, 2014

(65) Prior Publication Data
US 2015/0352517 A1    Dec. 10, 2015

(30) Foreign Application Priority Data
Jan. 23, 2013   (JP) ................................ 2013-010373

(51) Int. Cl.
*B01J 19/24* (2006.01)
*B01J 35/02* (2006.01)

(52) U.S. Cl.
CPC ............ *B01J 19/248* (2013.01); *B01J 19/249* (2013.01); *B01J 35/02* (2013.01); *B01J 2219/00076* (2013.01); *B01J 2219/2401* (2013.01); *B01J 2219/2459* (2013.01); *B01J 2219/2462* (2013.01); *B01J 2219/2465* (2013.01); *B01J 2219/2479* (2013.01); *B01J 2219/2498* (2013.01)

(58) Field of Classification Search
CPC .......... B01J 19/248; B01J 19/249; B01J 35/02
USPC ......................................................... 422/198
See application file for complete search history.

(56) References Cited

U.S. PATENT DOCUMENTS

| 5,560,425 A | * | 10/1996 | Sugawara | ............. F28D 1/0316 165/148 |
|---|---|---|---|---|
| 2004/0123523 A1 | | 7/2004 | Rong et al. | |
| 2010/0051246 A1 | | 3/2010 | Kim et al. | |
| 2012/0177550 A1 | | 7/2012 | Tsujii et al. | |

FOREIGN PATENT DOCUMENTS

| JP | 03-236565 A | 10/1991 |
|---|---|---|
| JP | 06-006955 U | 1/1994 |
| JP | 06-014772 U | 2/1994 |

(Continued)

*Primary Examiner* — Walter D Griffin
*Assistant Examiner* — Huy-Tram Nguyen
(74) *Attorney, Agent, or Firm* — Maschoff Brennan (57) ABSTRACT

In a catalytic reactor including catalyst carriers inserted into a plurality of channels defined by corrugated fins, the corrugated fins include a first corrugated fin, and a second corrugated fin arranged to adjoin the first corrugated fin. When viewed from the first corrugated fin toward the second corrugated fin along the channels, at least a portion of side walls of the second corrugated fin is located between two adjacent ones of side walls of the first corrugated fin at adjoining end faces of the first and second corrugated fins.

4 Claims, 5 Drawing Sheets

(56) References Cited

FOREIGN PATENT DOCUMENTS

| | | |
|---|---|---|
| JP | 2561680 Y2 | 10/1997 |
| JP | 2004-132620 A | 4/2004 |
| JP | 2006-514909 A | 6/2006 |
| JP | 2010-511137 A | 4/2010 |
| JP | 2011-062618 A | 3/2011 |

\* cited by examiner

CATALYTIC REACTOR

TECHNICAL FIELD

The present disclosure relates to a catalytic reactor, and more particularly relates to a catalytic reactor including catalyst carriers inserted into respective channels defined by corrugated fins.

BACKGROUND ART

Patent Document 1 describes a heat exchanger for an air conditioner. In the heat exchanger that includes a plurality of fins stacked at predetermined intervals, the fins are divided into a plurality of rows in a flow direction, and the flow between the fins is turned into a turbulent flow by shifting, by a half pitch, those groups of fins divided from each other in their stacking direction, thereby improving the heat exchange efficiency.

Patent Document 2 describes a plate fin heat exchanger which includes tube plates and corrugated fins that are stacked one upon the other and in which so-called "serrated fins" are used as the corrugated fins to improve the heat exchange efficiency.

Patent Document 3 describes a catalytic reactor in which the structure of a plate fin heat exchanger is used. That is to say, this catalytic reactor is configured such that corrugated fins are arranged in respective passages defined by tube plates to constitute a core, and rod-like catalyst carriers are inserted into a plurality of channels defined by the corrugated fins, and is also configured such that a catalytic reaction is caused when a fluid flows through the channels.

CITATION LIST

Patent Document

PATENT DOCUMENT 1: Japanese Unexamined Patent Publication No. H03-236565
PATENT DOCUMENT 2: Japanese Unexamined Utility Model Publication No. H06-14772
PATENT DOCUMENT 3: Japanese Unexamined Patent Publication No. 2011-62618

SUMMARY OF THE INVENTION

Technical Problem

In such a catalytic reactor as the one described in Patent Document 3, catalyst carriers inserted into respective channels may not be fixed there so that when the activity of the catalyst carriers declines, the catalyst carriers are readily replaced. For this reason, the studies carried out by the present inventors revealed that while a catalytic reactor was being transported, the catalyst carrier sometimes moved in its channel in the flow direction of a fluid and thus was displaced. The studies also revealed that while the catalytic reactor was being used, the catalyst carrier sometimes moved due to the force of a fluid flowing through its channel and that when used, for example, aboard a ship or in other similar environments, the catalyst carrier was sometimes displaced as the catalytic reactor moved.

Once the catalyst carrier has been displaced in the catalytic reactor, a catalytic reaction may occur at an unintended location. Or if the catalytic reactor includes catalyst carriers arranged in respective passages, which are adjacent to each other with a tube plate interposed between them, the catalyst carriers may become misaligned with each other between two adjacent ones of the passages that interpose such a tube plate, and catalytic reactions may be thus impaired.

According to the techniques described in Patent Documents 1 and 2, the arrangement of fins is modified to control the flow between the fins in view of the heat exchange efficiency of a heat exchanger, and these techniques are irrelevant to the arrangement of catalyst carriers in a catalytic reactor.

It is therefore an object of the present disclosure to avoid such a decline in the activity of a catalytic reactor, including catalyst carriers inserted into a plurality of channels defined by corrugated fins, by preventing the catalyst carriers from moving in the respective channels.

Solution to the Problem

To overcome the problems described above, the present inventors studied various structures. For example, a distributor fin provided in the core of a catalytic reactor is configured as a substantially triangular corrugated fin, and the boundary between this distributor fin and another corrugated fin into which catalyst carriers are inserted is tilted with respect to the flow direction of a fluid. Thus, a catalyst carrier may be inserted into each channel so that an end face of the catalyst carrier is in contact with this tilted boundary. This insertion allows the tilted boundary between the corrugated fin and the distributor fin to restrict the position of the catalyst carrier. However, the present inventors discovered that in such a configuration, the ends of the catalyst carriers could block openings of respective channels in the distributor fin. We also discovered that if catalyst carriers were positioned at the tilted boundary between the corrugated fin and the distributor fin, the lengths of the catalyst carriers inserted into respective channels would vary from one channel to another, and as a result, the fluid passing through the core could non-uniformly flow. Such a non-uniform flow in a catalytic reactor would cause a decline in activity.

To address this problem, the present inventors adopted the following method. Specifically, instead of positioning the catalyst carriers at the boundary between the corrugated fin and the distributor fin, corrugated fins are supposed to include a first corrugated fin defining a predetermined catalyst insertion region into which catalyst carriers are inserted, and a second corrugated fin arranged to adjoin the first corrugated fin and defining a catalyst non-insertion region adjacent to the catalyst insertion region. Also, the arrangement of the first and second corrugated fins is adjusted to position, at adjoining end faces of the first and second corrugated fins, the catalyst carriers inserted into respective channels defined by the first corrugated fin.

Specifically, the present disclosure relates to a catalytic reactor. This catalytic reactor includes: corrugated fins which are arranged in a passage where a fluid flows and in each of which side walls, partitioning the passage into a plurality of channels, are arranged at a predetermined pitch in an alignment direction orthogonal to a flow direction of the fluid; and catalyst carriers inserted into the plurality of channels defined by the corrugated fin and configured to extend in the flow direction of the fluid.

The corrugated fins include a first corrugated fin defining a predetermined catalyst insertion region into which the catalyst carriers are inserted, and a second corrugated fin arranged to adjoin the first corrugated fin and defining a catalyst non-insertion region adjacent to the catalyst insertion region. When viewed from the first corrugated fin toward the second corrugated fin along the channels, at least a portion of the side walls of the second corrugated fin is located between two adjacent ones of the side walls of the first corrugated fin at adjoining end faces of the first and second corrugated fins.

According to this configuration, the catalyst carriers are inserted into the plurality of channels defined by the first corrugated fin, and when the fluid flows through the channels, a catalytic reaction is caused. Also, the first corrugated fin, and the second corrugated fin arranged to adjoin the first corrugated fin are configured such that at least a portion of the side walls of the second corrugated fin is located between two adjacent ones of the side walls of the first corrugated fin. In other words, at least that portion of the side walls of the second corrugated fin faces an opening of one of the channels which are defined by the first corrugated fin and into each of which a catalyst carrier is inserted. For this reason, even if a catalyst carrier attempted to move in the flow direction of the fluid, the end face of the catalyst carrier and the side wall(s) of the second corrugated fin would interfere with each other. This would prevent the catalyst carrier from moving through the opening of the channel. The catalyst carrier is reliably positioned in the predetermined catalyst insertion region, and is prevented from moving from this region, which will thus produce satisfactory catalytic reactions.

Furthermore, according to this configuration, the end faces of the first corrugated fin and the second corrugated fin adjoining this first corrugated fin restrict the position of the catalyst carrier. This restriction allows the catalyst carriers inserted into the respective channels to have the same preset length, thus reducing the difference in pressure loss between the channels, and eventually preventing a non-uniform flow from being generated.

In this manner, the catalytic reactor produces satisfactory catalytic reactions and prevents a non-uniform flow from being generated, thereby avoiding a decline in activity.

The above-described configuration allows for restricting the positions of the catalyst carriers as long as the end faces of the first and second corrugated fins adjoin each other, and the first and second corrugated fins do not need to squarely face each other in their entirety. The second corrugated fin may be arranged to extend obliquely to the first corrugated fin, for example, depending on the shape of the second corrugated fin.

Here, the catalytic reactor may include two passages between which a tube plate is interposed, and catalyst carriers may be inserted into a plurality of channels defined by a corrugated fin arranged in each passage. In such a configuration, positioning the catalyst carriers at the adjoining end faces of the first and second corrugated fins prevents the catalyst carriers from being misaligned with each other in the adjacent passages between which the tube plate is interposed. Thus, impairment of catalytic reactions is reduced, and a decline in the activity of the catalytic reactor is avoidable.

The second corrugated fin may be configured to have a smaller pitch than the side walls of the first corrugated fin, and the side walls of the second corrugated fin may be misaligned with the side walls of the first corrugated fin in the alignment direction at the adjoining end faces of the first and second corrugated fins.

According to such an arrangement, when the first and second corrugated fins are arranged to adjoin each other, side wall(s) of the second corrugated fin will be located between side walls of the first corrugated fin, because the second corrugated fin has a smaller pitch than the first corrugated fin. As a result, the catalyst carriers inserted into the respective channels of the first corrugated fin interfere with the side walls of the second corrugated fin.

The second corrugated fin may be configured to have the same pitch as the side walls of the first corrugated fin, and the second corrugated fin may be arranged out of phase with the first corrugated fin such that the side walls of the second corrugated fin are misaligned with the side walls of the first corrugated fin in the alignment direction at the adjoining end faces of the first and second corrugated fins.

Such a configuration allows side wall(s) of the second corrugated fin to be located between side walls of the first corrugated fin, because the second corrugated fin having the same pitch as the first corrugated fin is arranged out of phase with the first corrugated fin. As a result, the catalyst carriers inserted into the respective channels of the first corrugated fin interfere with the side walls of the second corrugated fin.

The side walls of the first and second corrugated fins may be inclined relative to the alignment direction such that each channel has a trapezoidal or inverted trapezoidal cross section, and the second corrugated fin may be arranged inside out with respect to the first corrugated fin.

By adopting such an arrangement, each inclined side wall of the first corrugated fin and an oppositely inclined side wall of the second corrugated fin are arranged to cross each other at the adjoining end faces of the first and second corrugated fins. Thus, a portion of the side walls of the second corrugated fin is located between side walls of the first corrugated fin. As a result, the catalyst carriers inserted into the respective channels of the first corrugated fin interfere with the side walls of the second corrugated fin.

Advantages of the Invention

As can be seen from the foregoing description, according to this catalytic reactor, the first and second corrugated fins are arranged to adjoin each other such that at least a portion of the side walls of the second corrugated fin is located between two adjacent ones of the side walls of the first corrugated fin, and the catalyst carriers are inserted into the respective channels defined by the first corrugated fin, thereby preventing the catalyst carriers from moving. This allows for producing good catalytic reactions, and also allows the catalyst carriers inserted into the respective channels to have the same length, thus reducing a difference in pressure loss between the channels. Consequently, generation of a non-uniform flow and a decline in the activity of the catalytic reactor are reduced.

DESCRIPTION OF EMBODIMENTS

Figure 1:
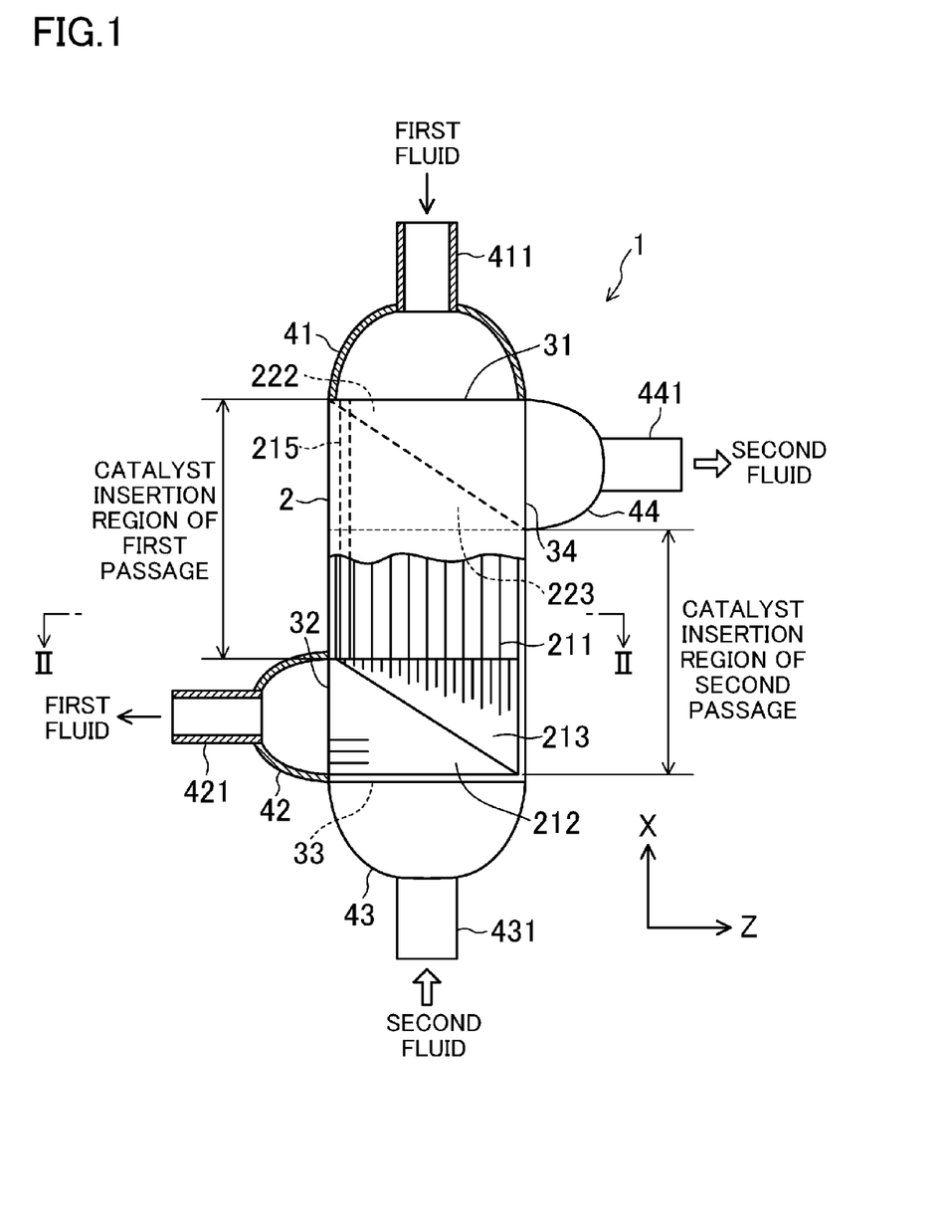
FIG. 1 is a partially cutaway front view illustrating a general configuration for a catalytic reactor.
Figure 2:
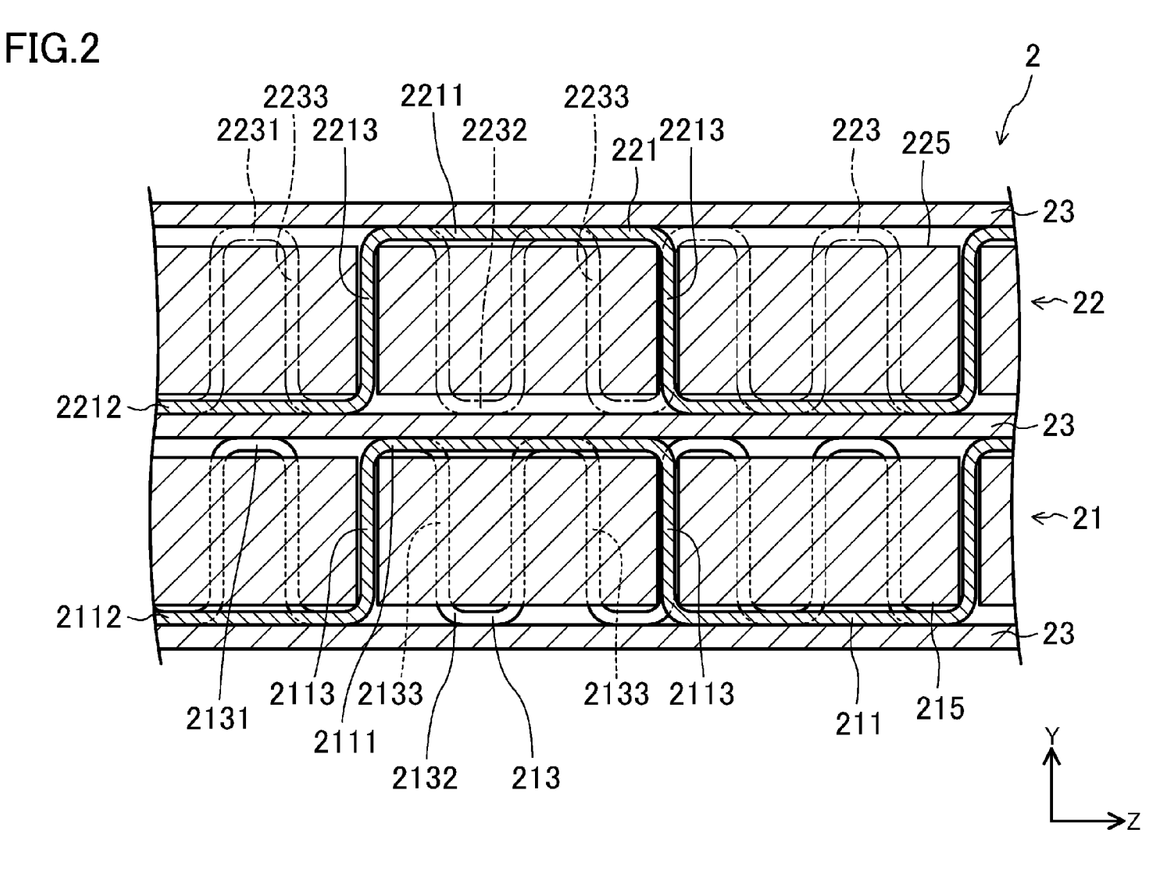
FIG. 2 is a cross-sectional view (a view taken along the plane II-II in FIG. 1) illustrating a configuration for adjoining end faces of first and second corrugated fins.

Embodiments of a catalytic reactor will now be described with reference to the drawings. Note that the following embodiments are preferred examples. FIG. 1 illustrates a general configuration for a catalytic reactor 1 according to an embodiment, and FIG. 2 illustrates part of the cross section taken along the plane II-II in FIG. 1. For the sake of convenience of explanation, the upward/downward direction on the paper on which FIG. 1 is drawn will be hereinafter referred to as an "X direction", the rightward/leftward direction there will be hereinafter referred to as a "Z direction", and the direction coming out of the paper will be hereinafter referred to as a "Y direction". Also, in each drawing, the upper side of the paper may be hereinafter referred to as "up," and the lower side thereof may be hereinafter referred to as "down". However, the terms "up" and "down" in the following description may not respectively correspond to the upper and lower sides of an actual catalytic reactor.

This catalytic reactor 1 basically includes a core 2 having the same structure as a plate fin heat exchanger. The core 2 includes a plurality of first passages 21 through which a first fluid flows, and a plurality of second passages 22 through which a second fluid flows. As partially illustrated in FIG. 2, the first and second passages 21 and 22 are alternately stacked in the Y direction with tube plates 23 interposed between them. Note that FIG. 2 illustrates only one of the first passages 21 and one of the second passages 22.

As indicated by the solid arrows in FIG. 1, the first fluid flows into the first passages 21 through the upper end face of the core 2, flows downward through the core 2, and then flows out through a side surface of the core 2 at a lower end portion thereof in the Z direction. As indicated by the hollow arrows in FIG. 1, the second fluid flows into the core 2 through the lower end face thereof, flows upward through the core 2, and then flows out through a side surface of the core 2 at an upper end portion thereof in the Z direction. As can be seen from the foregoing description, the core 2 is configured as a counter-flow type, through which the first and second fluids flow in the two opposite X directions. Note that this configuration for the core 2 is merely an example of the present disclosure. Alternatively, the core 2 may also be a parallel-flow type designed such that the flow directions of the first and second fluids are parallel to each other, or a cross-flow type through which the first and second fluids flow in directions orthogonal to each other.

As illustrated in FIG. 2, each of the first passages 21 of the core 2 includes a corrugated fin 211. The corrugated fin 211 partitions the first passage 21 into a plurality of channels arranged in the Z direction and extending in the X direction. Likewise, each of the second passages 22 also includes a corrugated fin 221, and the corrugated fin 221 also partitions the second passage 22 into a plurality of channels arranged in the Z direction and extending in the X direction. The corrugated fin 211 arranged in the first passage 21 includes upper and lower walls 2111 and 2112 each being in contact with one of the tube plates 23, and side walls 2113 extending straight in the Y direction to connect the upper and lower walls 2111 and 2112 together. The corrugated fin 221 arranged in the second passage 22 includes upper and lower walls 2211 and 2212 each being in contact with one of the tube plates 23, and side walls 2213 extending straight in the Y direction to connect the upper and lower walls 2211 and 2212 together. The first and second passages 21 and 22 each have the channels, each of which is defined by one of the upper walls 2111 and 2211 or one of the lower walls 2112 and 2212, two of the side walls 2113 and 2213, and one of the tube plates 23 and which has a substantially rectangular cross section. Note that the cross-sectional shape of each channel is merely an example of the present disclosure and may be any other appropriate one.

As conceptually illustrated in FIG. 1, a distributor fin 212 cut into a triangular shape is arranged around an outlet portion of each first passage 21 corresponding to a lower end portion of the core 2. The distributor fin 212 changes the direction of flow through the first passage 21 from the downward X direction to one horizontal Z direction (the leftward direction on the paper of FIG. 1). A distributor fin 222 cut into a triangular shape is also arranged around an outlet portion of each second passage 22 corresponding to an upper end portion of the core 2. The distributor fin 222 changes the direction of flow through the second passage 22 from the upward X direction to the other horizontal Z direction (the rightward direction on the paper of FIG. 1). Thus, the upper end face of the core 2 defines an inflow surface 31 thereof through which the first fluid flows into the core 2, and the side surface of a lower portion of the core 2 defines an outflow surface 32 thereof through which the first fluid flows out of the core. On the other hand, the lower end face of the core 2 defines an inflow surface 33 thereof through which the second fluid flows into the core, and the side surface of an upper portion of the core 2 defines an outflow surface 34 thereof through which the second fluid flows out of the core.

On the inflow surface 31 through which the first fluid flows into the core 2, an inflow header tank 41 is attached to the core 2 in order to distribute the first fluid into the channels of each first passage 21. An inflow nozzle 411 through which the first fluid flows in is attached to the inflow header tank 41. On the other hand, on the outflow surface 32 through which the first fluid flows out of the core 2, an outflow header tank 42 is attached to the core 2 in order to collect the first fluid that has passed through the channels of each first passage 21 and to allow the collected first fluid to flow out. An outflow nozzle 421 through which the first fluid flows out is attached to the outflow header tank 42. An inflow header tank 43 is attached to the inflow surface 33 through which the second fluid flows in, and an outflow header tank 44 is attached to the outflow surface 34 through which the second fluid flows out. The inflow header tank 43 and outflow header tank 44 for the second fluid respectively have the same configuration as the inflow header tank 41 and outflow header tank 42 for the first fluid. An inflow nozzle 431 and an outflow nozzle 441 are attached to the inflow header tank 43 and outflow header tank 44, respectively.

The first corrugated fin 211 in the first passage 21 is configured such that its upper and lower ends are orthogonal to the flow direction of the fluid (i.e., the X direction). A second corrugated fin 213 is arranged between this first corrugated fin 211 and the distributor fin 212.

The second corrugated fin 213 is a fin cut into a triangular shape just like the distributor fin 212, and is configured to partition the first passage 21 into a plurality of channels arranged in the Z direction just like the first corrugated fin 211. The second corrugated fin 213 will be hereinafter referred to as a "triangular fin 213." This triangular fin 213 is arranged to adjoin the first corrugated fin 211, thereby making the channels in the first passage 21 continuous in the X direction. As illustrated in FIG. 2, while the triangular fin 213 is configured to also include upper, lower, and side walls 2131, 2132, and 2133, its pitch is set to be less than that of the first corrugated fin 211 (where the pitch corresponds to the distance between two adjacent side walls 2113, 2113).

Specifically, in the example illustrated, the pitch of the triangular fin 213 is set to be a quarter of that of the first corrugated fin 211. Thus, as illustrated in FIG. 2, when viewed from the first corrugated fin 211 toward the triangular fin 213 along the channels, some (e.g., three in the example illustrated in FIG. 2) of the side walls 2133 of the second corrugated fin are located between two adjacent side walls 2113, 2113 of the first corrugated fin 211 at the adjoining end faces of the first corrugated fin 211 and the triangular fin 213.

The first corrugated fin 221 in the second passage 22 is also configured such that its upper and lower ends are orthogonal to the flow direction of the fluid (i.e., the X direction), and a triangular fin 223 cut into a triangular shape is arranged between the first corrugated fin 221 and the distributor fin 222 (see also FIG. 1).

As indicated by the phantom lines in FIG. 2, the triangular fin 223 is also configured to include upper, lower, and side walls 2231, 2232, and 2233 so as to partition the second passage 22 into a plurality of channels arranged in the Z direction just like the first corrugated fin 221. The pitch of the triangular fin 223 is also set to be a quarter of that of the first corrugated fin 221. Thus, the triangular fin 223 is arranged to adjoin the first corrugated fin 221, thereby making the channels in each second passage 22 continuous in the X direction. Also when viewed from the first corrugated fin 221 toward the triangular fin 223 along the channels, three of the side walls 2233 of the triangular fin 223 are located between two adjacent ones of the side walls 2213, 2213 of the first corrugated fin 221 at the adjoining end faces of the first corrugated fin 221 and the triangular fin 223.

In addition, in the catalytic reactor 1, a catalyst carrier 215 is inserted into each channel in the first passages 21. As conceptually illustrated in FIGS. 1 and 2, the catalyst carrier 215 extends in the X direction, is in the shape of a square bar having a cross section corresponding to the cross-sectional shape of the channel, and extends over the entire first corrugated fin 211 from one end through the other end thereof (see the "Catalyst Insertion Region of First Passage" in FIG. 1). Note that FIG. 1 illustrates only one catalyst carrier 215 for ease of understanding. Likewise, a square-bar-shaped catalyst carrier 225 extending in the X direction is also inserted into each channel in the second passages 22 (see FIG. 2). In each second passage 22, the catalyst carrier 225 also extends over the entire first corrugated fin 221 from one end through the other end thereof (see the "Catalyst Insertion Region of Second Passage" in FIG. 1), and the interaction of two catalytic reactions is expected in the region where catalyst insertion regions of the first and second passages 21 and 22 overlap with each other.

The core 2 may be formed by stacking the tube plates 23 and the corrugated fins 211, 212, 213, 221, 222, and 223 in a predetermined order and brazing them. The header tanks 41, 42, 43, and 44 are attached to the core 2 by welding. The catalyst carriers 215 in each first passage 21 are inserted one to one into the respective channels, which are open through the first fluid inflow surface 31 of the core 2 (i.e., the upper end face thereof), with the inflow surface 31 exposed before the attachment of the header tank 41. At the adjoining end faces of the first corrugated fin 211 and the triangular fin 213, the side walls 2133 of the triangular fin 213 are located between side walls 2113, 2113 of the first corrugated fin 211 as described above, and thus interfere with end faces of the catalyst carriers 215 inserted, thus positioning the catalyst carriers 215 (see also FIG. 2). Likewise, the catalyst carriers 225 in the second passage 22 are inserted one to one into the respective channels, which are open through the second fluid inflow surface 33 of the core 2 (i.e., the lower end face thereof), with the inflow surface 33 exposed before the attachment of the header tank 43. At the adjoining end faces of the first corrugated fin 221 and the triangular fin 223, these catalyst carriers 225 also interfere with, and are positioned by, the side walls 2233 of the triangular fin 223.

In this manner, in each of the first and second passages 21, 22 of the catalytic reactor 1 with this configuration, restricted are the positions of the catalyst carriers 215 and 225 arranged in the respective channels. This thus prevents the catalyst carriers 215 and 225 from moving in the respective channels in transit or during use, for example. In addition, since the catalyst carriers 215, 225 are not fixed in the channels, the carriers are easily replaceable by removing the header tank 41, 43 attached to the core 2 to expose the inflow surfaces 31, 33 of the core 2.

Furthermore, the catalyst carriers 215 are positioned at the adjoining end faces of the first corrugated fin 211 and the triangular fin 213, and the catalyst carriers 225 are positioned at the adjoining end faces of the first corrugated fin 221 and the triangular fin 223. This thus allows the catalyst carriers 215 and 225 inserted into the respective channels to have the same length. Thus, a difference in pressure loss between the channels, and eventually generation of a non-uniform flow, are reduced.

As can be seen, by preventing the catalyst carriers 215 and 225 from moving in the respective channels, not only catalytic reactions are improved but also generation of a non-uniform flow is reduced, thus avoiding a decline in the activity of the catalytic reactor 1.

Note that no catalyst carrier may be inserted into the second passages 22, depending on the intended application of the catalytic reactor 1. In that case, a corrugated fin having the same pitch as the first corrugated fin 221 may be used as the triangular fin 223 for the second passages 22. If such a corrugated fin having the same pitch is used, the first corrugated fin 221 and the triangular fin 223 may be integrated together.

Also, the pitches of the triangular fins 213 and 223 just need to be less than those of the first corrugated fins 211 and 221, respectively, and the pitches of the triangular fins 213 and 223 may be set to be, for example, a half or one-third of those of the first corrugated fins 211 and 221, respectively.

(First Variation)

Figure 3:
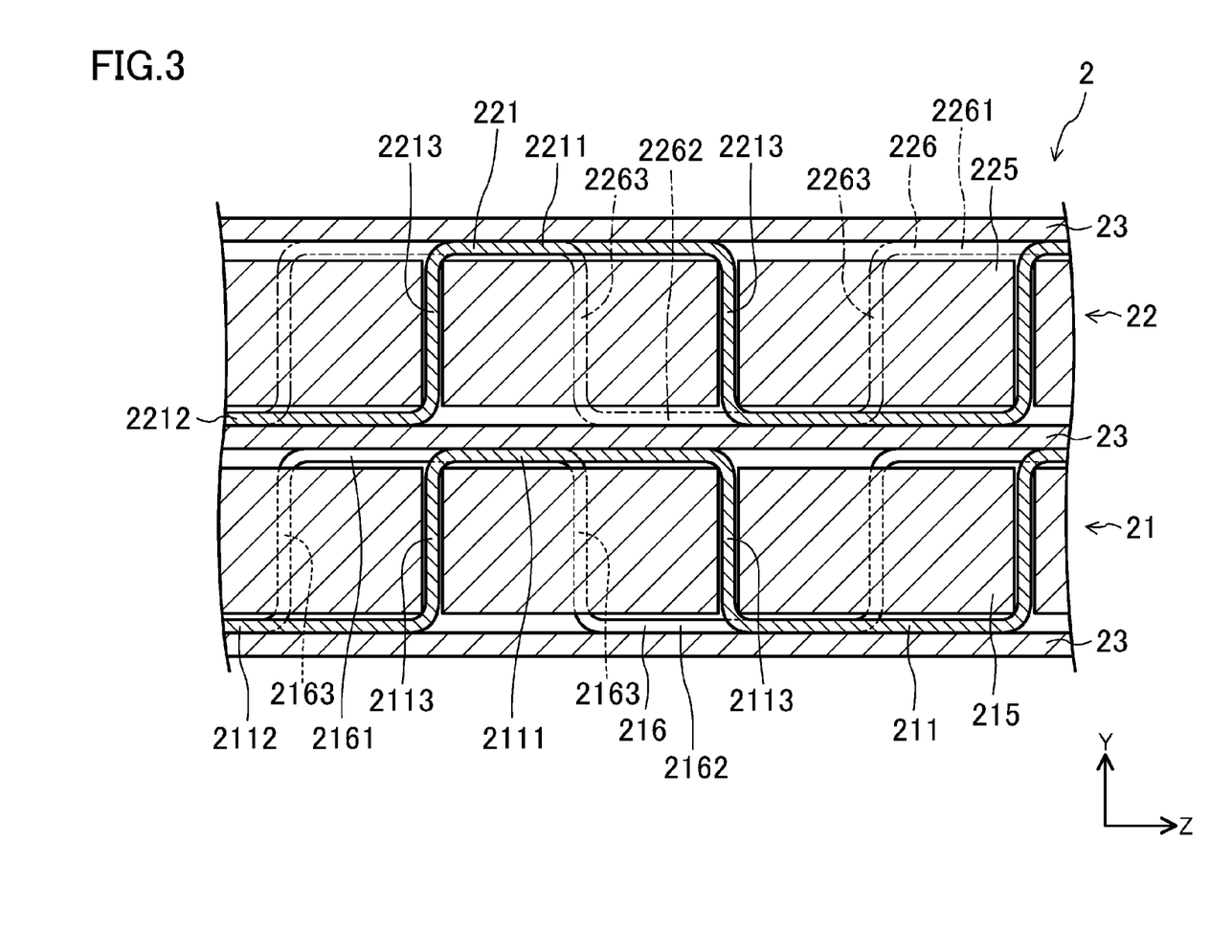
FIG. 3 is a view illustrating another configuration for adjoining end faces of first and second corrugated fins, which is different from that in FIG. 2, and corresponding to FIG. 2.

FIG. 3 illustrates a variation of a second corrugated fin (i.e., a triangular fin). In this variation, a second corrugated fin 216, which includes upper, lower, and side walls 2161, 2162, and 2163 and is arranged in the first passage 21, is set to have the same pitch as a first corrugated fin 211, and a second corrugated fin 226, which includes upper, lower, and side walls 2261, 2262, and 2263 and is arranged in the second passage 22, is set to have the same pitch as a first corrugated fin 221. On the other hand, the second corrugated fins 216 and 226 are respectively arranged out of phase with the first corrugated fins 211 and 221. In this description, if something is "arranged out of phase with" something else, such an arrangement is made so that side walls 2113 and 2163 of the first and second corrugated fins 211 and 216 arranged to adjoin each other are misaligned with each other in the Z direction, and side walls 2213 and 2263 of the first and second corrugated fins 221 and 226 arranged to adjoin each other are misaligned with each other in the Z direction. In the example illustrated in FIG. 3, the second corrugated fin 216 is arranged such that at adjoining end faces of the first and second corrugated fins 211 and 216, each side wall 2163 of the second corrugated fin 216 is located midway between two of the side walls 2113 of the first corrugated fin 211, and the second corrugated fin 226 is arranged such that at adjoining end faces of the first and second corrugated fins 221 and 226, each side wall 2263 of the second corrugated fin 226 is located midway between two of the side walls 2213 of the first corrugated fin 221. However, this magnitude of misalignment is merely an example of the present disclosure. Such arrangements allow end faces of catalyst carriers 215 and 225 inserted into respective channels to come into contact with the side walls 2113 and 2213 of the second corrugated fins 216 and 226, thereby allowing for positioning the catalyst carriers 215 and 225 as intended. According to this first variation, the first corrugated fins 211 and 221 and the second corrugated fin 216 and 226 may be configured as the same kind of corrugated fins, which is an advantage of this variation.

(Second Variation)

Figure 4:
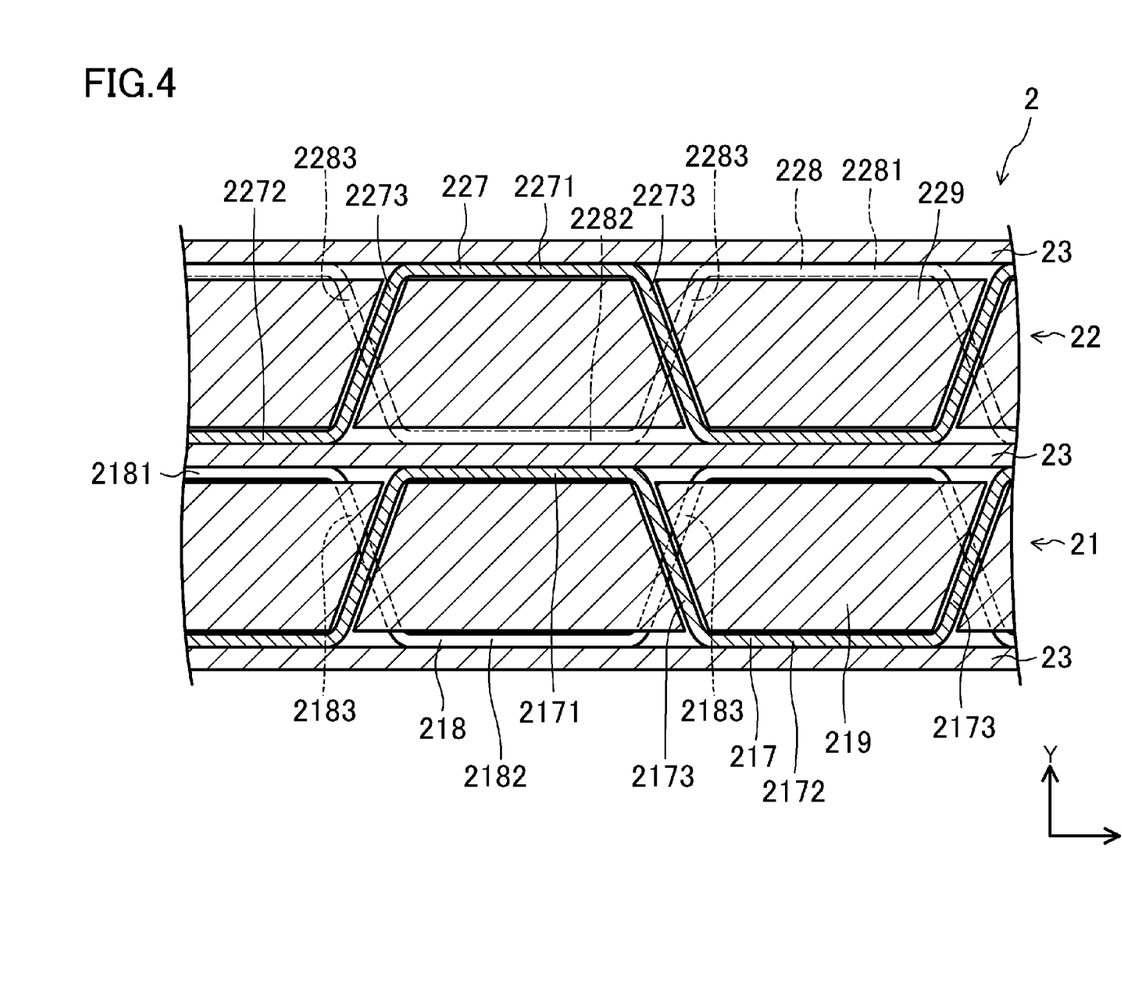
FIG. 4 is a view illustrating still another configuration for adjoining end faces of first and second corrugated fins, which is different from the ones in FIGS. 2 and 3, and corresponding to FIG. 2.

FIG. 4 illustrates a variation of first and second corrugated fins. In this variation, a first corrugated fin 217 and a second corrugated fin (i.e., a triangular fin) 218 that are arranged in the first passage 21 each have their side walls 2173 and 2183 inclined relative to the Y direction, and a first corrugated fin 227 and a second corrugated fin (i.e., a triangular fin) 228 that are arranged in the second passage 22 each have their side walls 2183 and 2283, inclined relative to the Y direction. Each channel defined by upper and lower walls 2171, 2271, 2181, 2281, 2172, 2272, 2182, 2282, the side walls 2173, 2273, 2183, and 2283, and a tube plate 23 is formed to have a trapezoidal or inverted trapezoidal cross section.

Also, in this second variation, the triangular fins 218 and 228 are arranged inside out with respect to the first corrugated fins 217 and 227, respectively. This is equivalent to arranging the second corrugated fins 218 and 228 out of phase with the first corrugated fins 217 and 227, respectively, as in the first variation. Thus, as is clear from FIG. 4, such arrangements allow the side walls 2173 of the first corrugated fin 217 to cross, at adjoining end faces of the first and second corrugated fins 217 and 218, the side walls 2183 of the second corrugated fin 218, a portion of which is located between adjacent ones of the side walls 2173 of the first corrugated fin 217. Such arrangements also allow the side walls 2273 of the first corrugated fin 227 to cross, at adjoining end faces of the first and second corrugated fins 227 and 228, the side walls 2283 of the second corrugated fin 228, a portion of which is located between adjacent ones of the side walls 2273 of the first corrugated fin 227. Consequently, according to this variation, a catalyst carrier 219, 229 inserted into each channel is positioned. In the example illustrated in FIG. 4, the cross section of the catalyst carrier 219, 229 is supposed to be a trapezoidal one corresponding to the shape of the channel. However, this cross-sectional shape of the catalyst carrier 219, 229 in the second variation is merely an example of the present disclosure. In this variation, the first corrugated fins 217 and 227 and the second corrugated fins 218 and 228 may also be configured as the same kind of corrugated fins.

(Third Variation)

Figure 5:
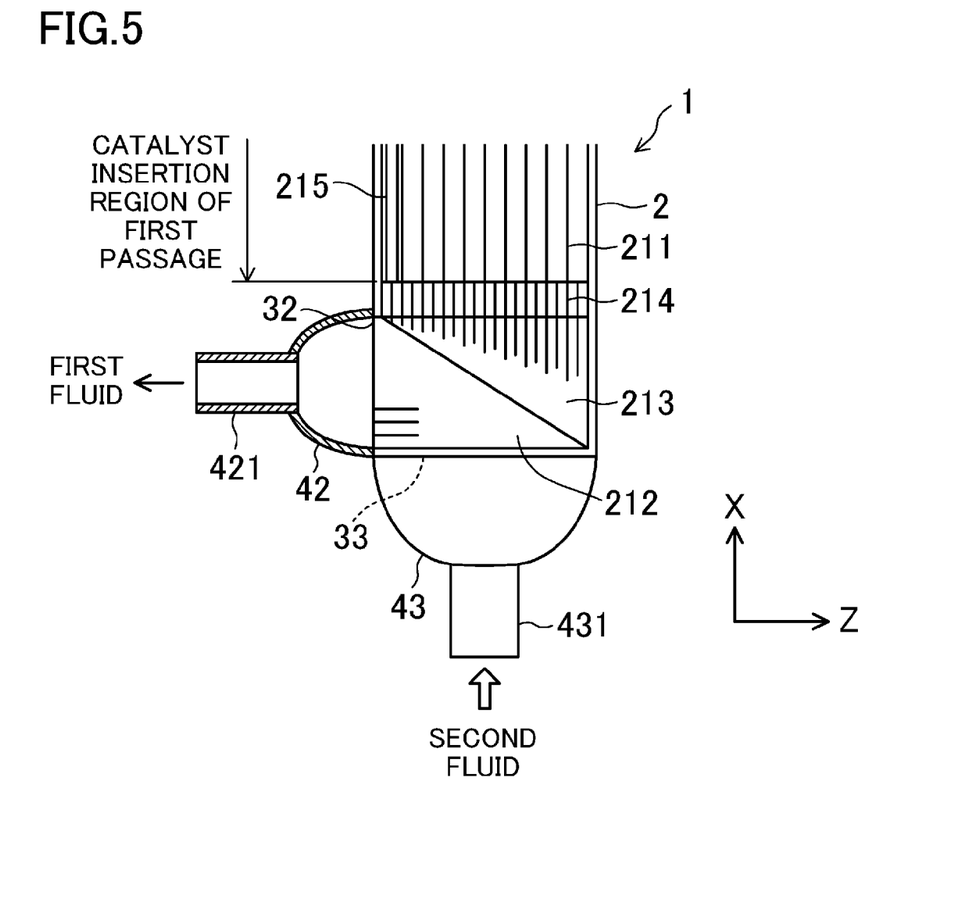
FIG. 5 is a view illustrating another exemplary configuration for the first and second corrugated fins adjoining each other.

A third variation is a variation of the arrangement of corrugated fins. As illustrated in FIG. 5, the length of a first corrugated fin 211 in the first passage 21 is set to be shorter than in the example shown in FIG. 1. Another corrugated fin 214 is arranged between the first corrugated fin 211 and a triangular fin 213, and adjoining end faces of the first corrugated fin 211 and the corrugated fin 214 are used to position catalyst carriers 215. That is to say, in the third variation, the corrugated fin 214 corresponds to a second corrugated fin. In the example illustrated in FIG. 5, the second corrugated fin 214 is configured as a fin having a smaller pitch than the first corrugated fin 211. However, the configurations of the first and second variations described above are also applicable to the second corrugated fin thus configured. Although not shown, the second passage 22 just needs to adopt a configuration identical or similar to that of the first passage 21.

Optionally, in this variation, the triangular fin 213 and the second corrugated fin 214 do not have to be provided separately but may be integrated together so that the resultant combined corrugated fin, having a trapezoidal shape as a whole, may be arranged between the first corrugated fin 211 and a distributor fin 212.

Note that the above-described embodiments shown in FIGS. 1 and 2, the first variation shown in FIG. 3, the second variation shown in FIG. 4, and the third variation shown in FIG. 5 may be combined together within a permissible range.

The configuration of the catalytic reactor described above is merely an example, and the present disclosure should not be construed as being limited to this configuration.

INDUSTRIAL APPLICABILITY

As can be seen from the foregoing description, the catalytic reactor of the present disclosure is useful as a catalytic reactor in various processes, because the reactor allows for always producing good catalytic reactions and reducing generation of a non-uniform flow by preventing catalyst carriers, inserted into a plurality of channels, from moving in the respective channels.

DESCRIPTION OF REFERENCE CHARACTERS

1 Catalytic Reactor
21 First Passage
22 Second Passage
211 First Corrugated Fin
2113 Side Wall
213 Triangular Fin (Second Corrugated Fin)
2133 Side Wall
214 Second Corrugated Fin
215 Catalyst Carrier
216 Second Corrugated Fin
2163 Side Wall
217 First Corrugated Fin
2173 Side Wall
218 Second Corrugated Fin
2183 Side Wall
219 Catalyst Carrier
221 First Corrugated Fin
2213 Side Wall
223 Triangular Fin (Second Corrugated Fin)
2223 Side Wall
225 Catalyst Carrier
226 Second Corrugated Fin
2263 Side Wall
227 First Corrugated Fin
2273 Side Wall
228 Second Corrugated Fin
2283 Side Wall
229 Catalyst Carrier

The invention claimed is:
1. A catalytic reactor comprising:
corrugated fins which are arranged in a passage where a fluid flows and in each of which side walls, partitioning the passage into a plurality of channels, are arranged at a predetermined pitch in an alignment direction orthogonal to a flow direction of the fluid; and catalyst carriers inserted into the plurality of channels defined by the corrugated fins and configured to extend in the flow direction of the fluid, wherein the corrugated fins include a first corrugated fin defining a predetermined catalyst insertion region into which the catalyst carriers are inserted and arranged, and a second corrugated fin arranged to adjoin the first corrugated fin and defining a catalyst non-insertion region adjacent to the catalyst insertion region, and when viewed from the first corrugated fin toward the second corrugated fin along the channels, at least a portion of the side walls of the second corrugated fin is located between two adjacent ones of the side walls of the first corrugated fin at adjoining end faces of the first and second corrugated fins.

2. The catalytic reactor of claim 1, wherein the second corrugated fin is configured to have a smaller pitch than the side walls of the first corrugated fin, and the side walls of the second corrugated fin are misaligned with the side walls of the first corrugated fin in the alignment direction at the adjoining end faces of the first and second corrugated fins.

3. The catalytic reactor of claim 1, wherein the second corrugated fin is configured to have the same pitch as the side walls of the first corrugated fin, and the second corrugated fin is arranged out of phase with the first corrugated fin such that the side walls of the second corrugated fin are misaligned with the side walls of the first corrugated fin in the alignment direction at the adjoining end faces of the first and second corrugated fins.

4. The catalytic reactor of claim 1, wherein the side walls of the first and second corrugated fins are inclined relative to the alignment direction such that each channel has a trapezoidal or inverted trapezoidal cross section, and the second corrugated fin is arranged inside out with respect to the first corrugated fin.

* * * * *